United States Patent [19]
Koop

[11] Patent Number: 4,849,603
[45] Date of Patent: Jul. 18, 1989

[54] ALIGNMENT LASER PERISCOPE

[75] Inventor: Dale E. Koop, Sunnyvale, Calif.

[73] Assignee: Rofin-Sinar, Inc., San Jose, Calif.

[21] Appl. No.: 197,033

[22] Filed: May 20, 1988

[51] Int. Cl.[4] .................. B23K 26/02

[52] U.S. Cl. .................. 219/121.78; 219/121.76; 356/153

[58] Field of Search .................. 219/121.78, 121.76, 219/121.79; 356/153

[56] References Cited

U.S. PATENT DOCUMENTS 4,724,298 2/1988 Hawkins et al. .............. 219/121.78

*Primary Examiner*—C. L. Albritton

*Attorney, Agent, or Firm*—Donald C. Feix

[57] ABSTRACT

An alignment apparatus for aligning a main, high power laser beam with a workpiece by the use of a low power laser beam while the main, high power laser beam is shuttered off from contact with the workpiece includes a periscope for displacing the low power beam laterally to be coaxial with the axis of the first beam during the time that the high power beam is shuttered off from the workpiece. The alignment apparatus includes adjustment mechanism for adjusting the angular position of the low power laser to make the axis of the low power laser beam exactly parallel to the axis of the high power laser beam for the particular periscope being used.

8 Claims, 4 Drawing Sheets

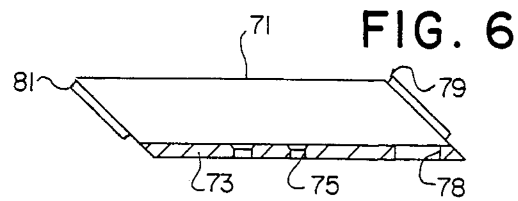
FIG. 6
71
81
79
73
75
78
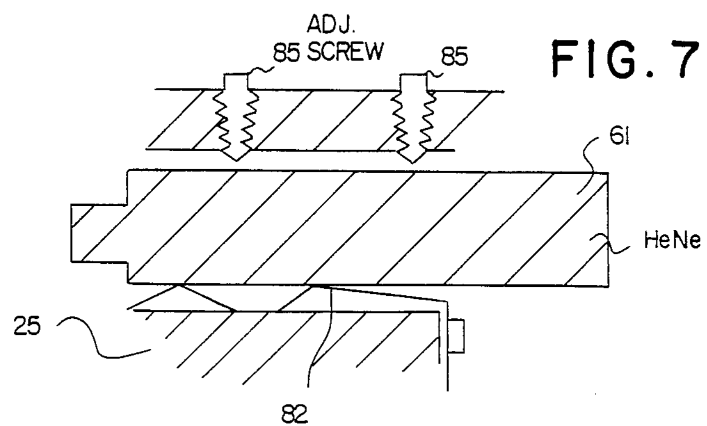
FIG. 7
ADJ.
85 SCREW
85
61
HeNe
25
82
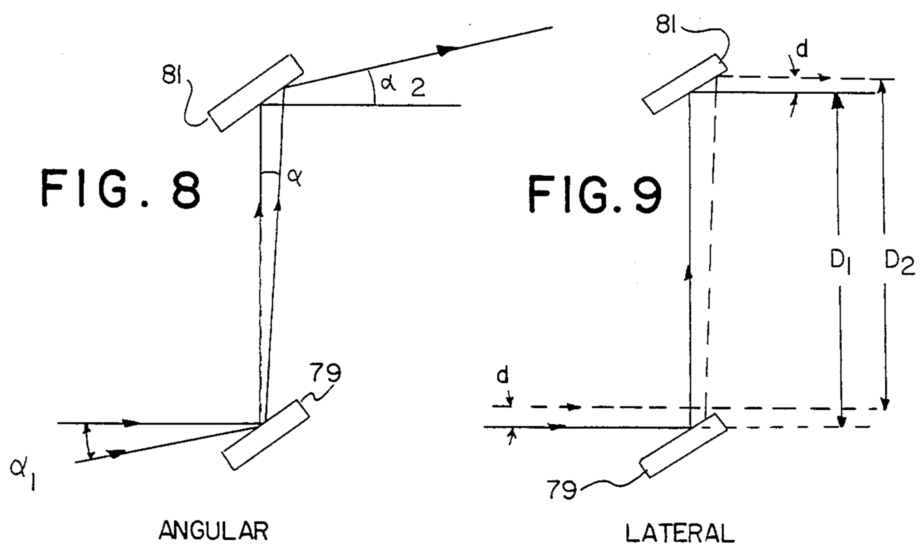
FIG. 8
81
α 2
α
79
α 1
ANGULAR
α1 = α2
FIG. 9
81
d
D1
D2
d
79
LATERAL
D1 = D2

ALIGNMENT LASER PERISCOPE

BACKGROUND OF THE INVENTION

This invention relates to alignment apparatus and methods for aligning a main, high power laser beam with a workpiece by the use of a low power laser beam while the main, high power beam is shuttered off from contact with the workpiece.

This invention relates particularly to alignment apparatus and methods which incorporate a periscope for maintaining the axes of the two beams parallel while displacing the second beam laterally to be coaxial with the axis of the first beam when the high power beam is shuttered off from the workpiece.

In systems using high power laser beams to perform work on workpieces, it is desirable to have a low power beam which can be used for aligning the high power laser beam with respect to the workpiece, or for aligning the workpiece with respect to the laser beam, when the high power beam is shuttered off.

Sliding and pivoting shutter mechanisms have been used for this purpose. These mechanisms have presented a number of problems.

One problem was that the mechanisms had to be controlled very precisely. Precise control was required to insure that there would not be any wobble or changes of position of the mechanisms or any mechanical or thermal vibrations of the mechanisms which could change or affect the required coaxial positions of the two beams.

Obtaining the required precision often required the use of expensive, precision components and shutter mechanisms and robust and relatively expensive bearing mounts. Wear or other changes to the mechanisms could also introduce errors in alignment.

SUMMARY OF THE INVENTION

It is a primary object of the present invention to construct and to operate alignment apparatus which overcome the problems of the prior apparatus and methods.

It is a related object to construct and operated an alignment apparatus which can tolerate slight angular and lateral deviations in the positions at which the shutter mechanism comes to rest so that the shutter mechanism does not have to come exactly to rest at the same point every time.

In accordance with the present invention a periscope maintains parallelism of the main, high power laser beam and the low power laser beam while displacing the low power beam laterally to be coaxial with the axis of the high power beam when the high power beam is shuttered off from the workpiece. The low power beam can then be used to accurately align the axis of the high power beam with the workpiece.

The periscope is constructed to maintain the low power beam insensitive to slight lateral and angular displacements of the periscope with respect to the axis of the high power beam as the periscope is moved into and out of the a is of the high power beam during repeated cycles of shuttering and unshuttering of the high power beam.

The alignment apparatus includes an adjustment mechanism for adjusting the angular position of the low power laser to make the axis of that low power laser exactly parallel to the axis of the high power laser beam for the particular periscope being used. The low power alignment laser can be adjusted to be at the exact displacement for the particular periscope. The adjustment can compensate for any small angular deviations in that particular periscope.

Alignment apparatus and methods which incorporate the features noted above and which are effective to function as described above constitute further, specific objects of the present invention.

Other and further objects of the present invention will be apparent from the following description and claims and are illustrated in the accompanying drawings which, by way of illustration, show preferred embodiments of the present invention and the principles thereof and what are no considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a top plan view of the output end of a high power laser which incorporates an alignment laser periscope apparatus constructed in accordance with one embodiment of the present invention. The alignment laser periscope apparatus is used for aligning a main, high power laser beam with a workpiece by the use of a low power laser beam while the main, high power beam is shuttered off from contact with the workpiece;

FIG. 3 shows how a periscope of the alignment laser periscope apparatus of the present invention is used with the pivoting shutter and beam dump mechanism;

FIG. 6 is a side view, partly in cross section to show details of construction, of a periscope used in one embodiment of the present invention;

FIG. 7 is a diagramatic view showing an adjustment mechanism for adjusting the angular position of the low power laser for making the axis of the low power laser beam parallel to the axis of the high power laser beam.

FIG. 8 is a diagramatic view showing how the fixed positions of the two reflecting surfaces of the periscope maintain the second beam insensitive to slight angular displacements of the periscope with respect to the axis of the main laser beam as the periscope is moved into and out of the axis of the main laser beam during repeated cycles of shuttering and unshuttering of the main laser beam;

FIG. 9 is a diagramatic view showing how the periscope holds the two reflecting surfaces in fixed positions so as to maintain the second beam insensitive to slight lateral displacements of the periscope with respect to the axis of the main laser beam as the periscope is moved into and out of the axis of the main laser beam during repeated cycles of shuttering and unshuttering of the main laser beam.

DETAILED DESCRIPTION OF THE PREFERRED EMBODIMENTS

Figure 1:
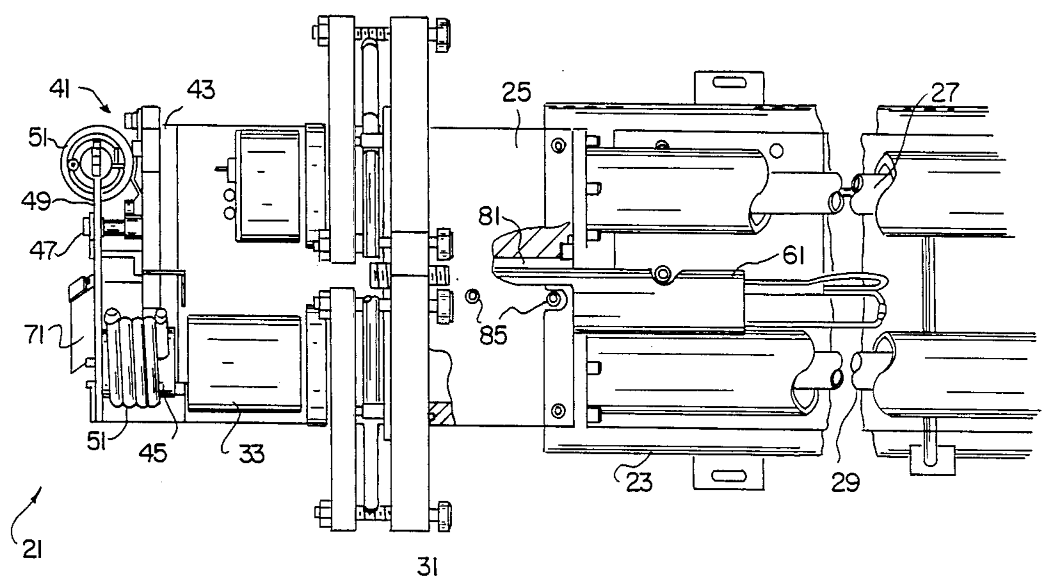

FIG. 1 is a top plan view of the output end of a high power laser which incorporates an alignment laser periscope apparatus 21 constructed in accordance with one embodiment of the present invention.

The high power laser shown in FIG. 1 is a fast axial flow carbon dioxide laser which has a laser head arranged to provide folding of the laser beam into two linear passes. The high power carbon dioxide laser shown in FIG. 1 is generally like that illustrated and described in U.S. Pat. No. 4,672,620 issued June 9, 1987 to Slusher et al and assigned to SpectraPhysics, Inc. and entitled "Fast Axial Flow Carbon Dioxide Laser". This U.S. Pat. No. 4,672,620 is incorporated by reference in this application in accordance with the provisions of Section 608.01(p)B. of the *Manual of Patent Examining Procedure* of the United States Patent and Trademark Office.

Figure 2:
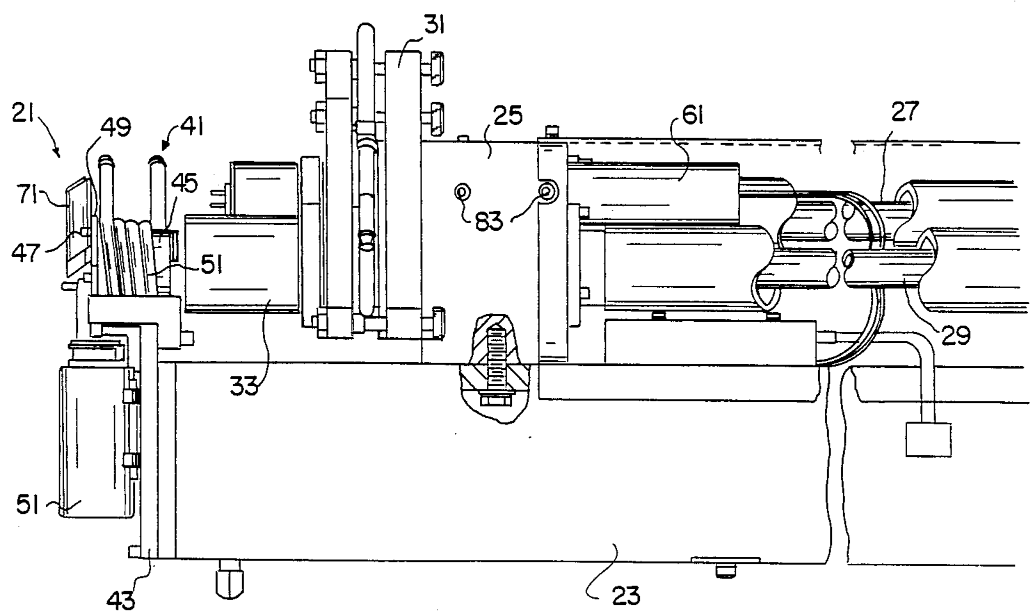
FIG. 2 is a front elevation view of the structure shown in FIG. 1.
Figure 3:
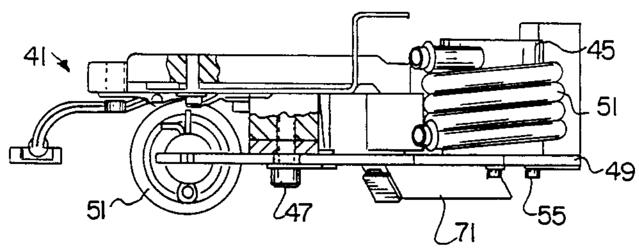
FIG. 3 is a top plan view showing details of a pivoting shutter and beam dump mechanism shown in FIGS. 1 and 2.

It should be noted, however, that the alignment apparatus of the present invention is not limited to the specific carbon dioxide laser shown in FIGS. 1 and 2 but is instead useable with a variety of high power laser constructions.

The purpose of the alignment apparatus 21 of the present invention is to permit a main, high power laser beam to be aligned with a workpiece by the use of a low power beam while the main, high power beam is shuttered off from contact with the workpiece.

As will be described in more detail in the description to follow, the alignment apparatus of the present invention includes a periscope for maintaining parallelism of the axes of the high power and the low power beam while displacing the low power beam laterally to be coaxial with the axis of the high power beam when the high power beam is shuttered off from the workpiece.

The periscope of the present invention is constructed to maintain the second beam insensitive to slight lateral and angular displacements of the periscope means with respect to the axis of the high power beam as the periscope is moved into and out of the axis of the high power beam during repeated cycles of shuttering and unshuttering of the high power beam.

This is an important benefit of the present invention because it permits the low power beam to be maintained coaxial with the high power beam without using expensive precision components. The periscope of the present invention can tolerate slight angular deviations, and this permits the use of a very simple bearing mount which does not have to come exactly to rest at the same point every time.

As shown in FIGS. 1 and 2, the main laser structure comprises a mainframe or strong back 23. An inlet manifold block 25 is mounted on the mainframe 23 and supports the adjacent ends of the paired fast axial flow main laser tubes 27 and 29.

The laser light beam path within the tubes 27 and 29 is folded by a reflecting mirror construction (not shown in FIG. 1 or FIG. 2) at the right hand ends of the tubes 27 and 29. The reflecting mirror construction for folding the light path can be like that shown in the U.S. Pat. No. 4,672,620 referred to above.

A mirror mounting plate 31 is also mounted on the manifold block 25.

The main, high power output laser beam passes through a tube 33.

The axis of the main, high power output laser beam is therefore the axis of the tube 29.

This main, high power laser output beam is shuttered off from the workpiece when it is necessary to change the workpieces or when it is necessary to align or realign a workpiece with the axis of the high power laser output beam.

The mechanism for shuttering of the high power beam is indicated generally by the general reference numeral 41 in FIGS. 1-5.

This shutter mechanism 41 includes a mounting plate 43, a high power beam dump 45, a pivot 47, a pivot arm 49, and a solenoid 51 having a movable plunger 53 associated with one end of the pivot arm 49.

As shown in FIGS. 1 and 2, the mounting plate 43 mounts the shutter assembly to the mainframe 23.

The high power beam dump 45 is constructed with internal, conical shaped, baffle surfaces which cause the high power output beam to undergo multiple reflections with the beam dump so as to dissipate the power of the output beam to the beam dump 45. Cooling coils 51 transfer the heat from the beam dump 45 to a heat sink.

The beam dump 45 is mounted on the pivot arm 49 by fasteners 55.

Limit switches 57 and 59 (see FIG. 4) limit the angular movement of the pivot arm 49 about the pivot 47.

Figure 4:
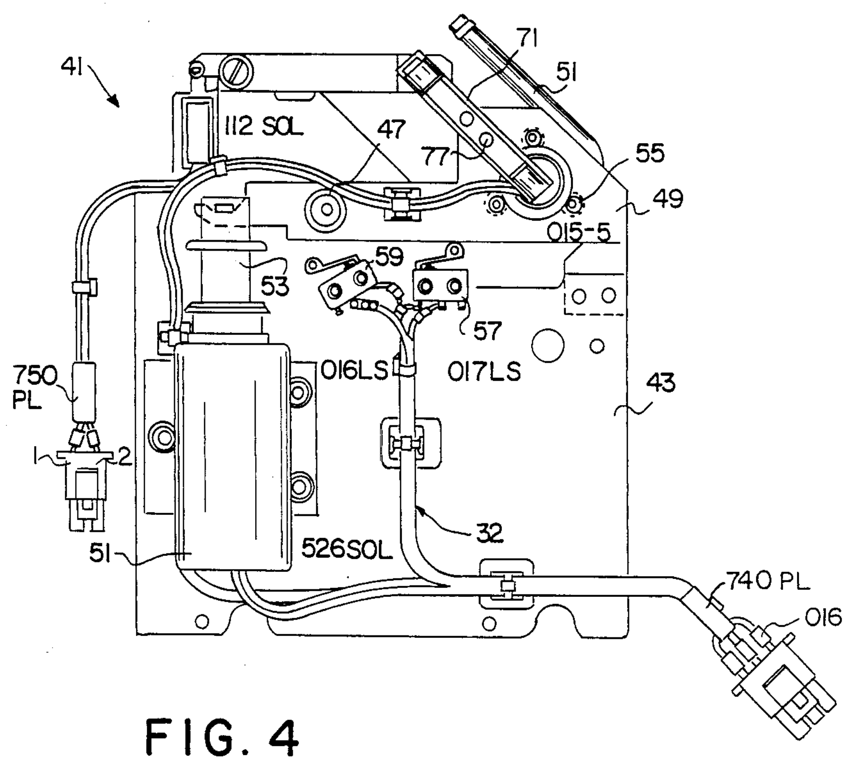
FIG. 4 is a front elevation view of the apparatus shown in FIG. 3.
Figure 5:
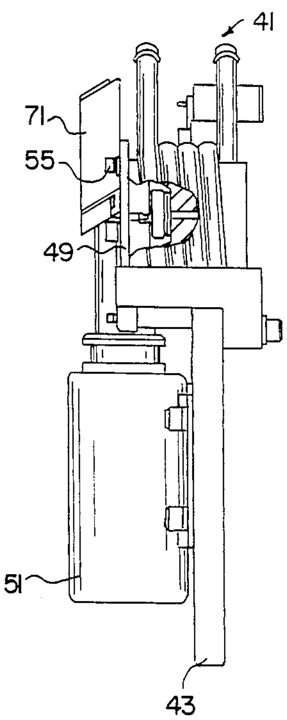
FIG. 5 is a side elevation view of the apparatus shown in FIGS. 3 and 4.

In the operation of the shutter mechanism 41, actuation of the solenoid 51, in one direction moves the pivot arm 41 to the position shown in FIG. 4. This puts the beam dump 45 directly in line with the axis of the main, high output power laser beam (the axis of the tube 29) and dumps the output power of the main laser beam into the beam dump during the time that the main beam is shuttered off from contact with the workpiece.

When the solenoid is actuated to pull the plunger 53, in the other direction (downward, as viewed in FIG. 4) the pivot arm 49 pivots about the pivot 47 to swing the beam dump 45 upward and leftward, as viewed in FIG. 4, and out of the path of the main power output beam.

The main power output beam then contacts the workpiece to perform work on the workpiece.

In accordance with the present invention a second, low power laser 61 (see FIG. 1 and FIG. 2) is mounted within the manifold block 25. The axis of the low power laser 61 extends parallel to the axis of the tube 29 of the main, high power laser.

In one specific embodiment of the present invention the low power laser 61 is a helium-neon laser.

The output beam of this low power 61 is used for aligning the axis of the main, high power laser beam with the workpiece while the main, high power laser is shuttered off from contact with the workpiece.

The alignment apparatus 21 of the present invention includes periscope means for maintaining parallelism of the main, high power laser beam and the low power laser beam while displacing the low power laser beam laterally to be coaxial with the axis of the high power beam when the high power beam is shuttered off from the workpiece. The low power beam can then be used to align the axis of the high power beam with the workpiece.

The periscope means comprise a periscope 71.

The periscope 71 (see FIG. 4 and FIG. 6) comprises a mainframe 73 which is formed with openings 75 for cap screws 77 (see FIG. 4) used to attach the periscope to the pivot arm 49.

The frame 73 of the periscope 71 has an opening 78 and two mirrors 79 and 81.

The laser beam from the low power laser 61 passes through the opening 78 and is reflected off the inside surface of the mirror 79. The reflected beam is directed to the mirror 81 and is further reflected off the inside surface of the mirror 81 and to the workpiece.

The reflecting surfaces of the mirrors 79 and 81 are parallel and are fixed in position on the periscope 71 so that these two mirrors produce a lateral displacement of the low power laser beam as this beam is reflected through the periscope. The amount of the lateral displacement is that needed to make the low power beam coaxial with the axis of the high power beam when the pivot arm 49 is in the position (illustrated in FIG. 4) in which the beam dump 45 intercepts and shutters off the main, high power laser beam.

In accordance with the present invention the low power laser tube 61 is mounted within the manifold block 25 in a way such as to permit adjusting the angular position of the low power laser to make the axis of that low power laser exactly parallel to the axis of the high power beam with the particular periscope 71 mounted in position on the shutter mechanism.

This mounting arrangement for the low power laser 61 includes resilient leaf springs 81 and 82. Spring 81 is shown in the broken away portion of FIG. 1. Spring 82 is shown in FIG. 7. Adjustment screws 83 are associated with the leaf spring shown in FIG. 1, and adjustment screws 85 are associated with the leaf spring 82 shown in FIG. 7. The alignment of the tube 61 can be adjusted in two different directions to obtain the exact parallelism required. These adjustment screws and leaf springs permit adjustment of the alignment laser 61 so as to be at the exact displacement for the particular periscope being used. The adjustment screws and leaf springs compensate for any small angular deviations that might be present in the particular periscope.

Once that alignment has been done by appropriate adjustment of the screws 83 and 85, the low power laser 61 is aligned permanently and in parallel with the high power laser 29. The parallelism of the axes of the low power laser 61 and the high power laser 29 and the displacement of the reflected low power beam laterally to be coaxial with the axis of the high power beam (when the high power beam is shuttered off from the workpiece) are thereafter insensitive to slight lateral and angular displacements of the periscope means with respect to the axis of the high power beam as the periscope 71 is moved into and out of the axis of the high power beam during repeated cycles of shuttering and unshuttering of the high power beam.

The diagrammatic showings in FIG. 8 and FIG. 9. illustrate this benefit of the alignment apparatus of the present invention.

FIG. 8 shows how the fixed positions of the two reflecting mirrors 79 and 81 of the periscope 71 maintain the low power beam insensitive to slight angular displacements of the periscope with respect to the axis of the main laser beam as the periscope is moved into and out of the axis of the main laser beam during shuttering and unshuttering of the main laser beam. As illustrated in FIG. 8, any angular difference ($alpha_1$) of the incoming beam with respect to the mirror 79 is exactly matched by an angular difference ($alpha_2$) of the outgoing beam with respect to the second mirror 81. $Alpha_1$ is equal to $alpha_2$ As shown in FIG. 9 any difference in lateral positioning of the mirror 79 with respect to the axis of the incoming low power beam is exactly matched by the difference in position of the mirror 81 with respect to the axis of the outgoing beam. The distances $D_1$ and $D_2$ are always equal and thus the axial displacement of the low power beam is always the same.

The present invention thus provides an alignment apparatus which is insensitive to slight movements or changes in the positions occurring during repeated cycles of opening and closing of the shutter. The alignment apparatus of the present invention maintains the low power beam coaxial with the high power beam without having to use expensive, precision components. The shutter mechanism is not required to come to the same exact place each time or to keep in the same angular orientation each time. Slight angular and lateral deviations can be tolerated. This permits the use of a very simple bearing mount, because the shutter mechanism does not have to come exactly to rest at exactly the same point every time.

It should be noted that the present invention is not limited to a pivoting mechanism. The present invention can also be equally well used with a sliding mechanism which slides a shutter into and out of a position rather than pivoting the shutter angularly.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An alignment apparatus for aligning a main, high power laser beam with a workpiece by the use of a low power laser beam while the main, high power beam is shuttered off from contact with the workpiece, said alignment apparatus comprising, a high power laser which produces a first, main, high power laser output beam along a first axis, a low power laser which produces a second, low power laser output beam along a second axis which is offset laterally from the first axis, adjustment means for adjusting the angular position of the low power laser to make the second axis parallel to the first axis, and periscope means for maintaining parallelism of the first and second beams while displacing the second beam laterally to be co-axial with the axis of the first beam at a time when the high power beam is shuttered off from the workpiece so that the second beam can be used to align the axis of the first beam with the workpiece.

2. The invention defined in claim 1 wherein the periscope means are constructed to maintain the second beam insensitive to slight lateral and angular displacements of the periscope means with respect to the first axis as the periscope means are moved into and out of the first axis during repeated cycles of shuttering and unshuttering of the first beam.

3. The invention defined in claim 1 wherein the high power laser is a carbon dioxide laser and the low power laser is a helium neon laser.

4. The invention defined in claim 1 wherein the adjustment means include springs and co-acting adjustment screws engagable with the low power laser.

5. The invention defined in claim 1 include a movable shutter mechanism, a high power beam dump mounted on the shutter mechanism and wherein the periscope means include a periscope which is also mounted on the shutter mechanism.

6. The invention defined in claim 5 including actuator means for moving the shutter mechanism to cause the beam dump to be moved into and out of alignment with the high power laser beam and wherein the periscope includes two mirrors which are parallel and which are fixed in position with respect to one another for producing a fixed amount of lateral displacement of the low power beam effective to make the axis of the second, low power beam coaxial with the axis of the first, high power laser beam when the shutter positions the high power beam dump to intercept the high power beam.

7. An alignment method for aligning a main, high power laser beam with a workpiece by the use of a low power laser beam while the main, high power beam is shuttered off from contact with the workpiece, said alignment method comprising, producing a first, main, high power laser output beam along a first axis, producing a second, low power laser output-beam along a second axis which is offset laterally from the first axis, adjusting the angular position of the low power laser to make the second axis parallel to the first axis, shuttering off the first beam from contact with the workpiece, maintaining parallelism of the first and second beams by a periscope means while displacing the second beam laterally by the periscope means to make the second axis co-axial with the first axis-so that the second beam can be used to align the axis of the first beam with the workpiece while the first beam is shuttered off from contact with the workpiece.

8. The invention defined in claim 7 including maintaining the second beam insensitive to slight lateral and angular displacements of the periscope means with respect to the first axis as the periscope means are moved into and out of the first axis during repeated cycles of shuttering and unshuttering of the first beam.

* * * * *